United States Patent
Shin

(10) Patent No.: US 12,556,117 B2
(45) Date of Patent: Feb. 17, 2026

(54) APPARATUS AND METHOD FOR DETECTING ABNORMAL INDUCTANCE OF INTERIOR PERMANENT MAGNET SYNCHRONOUS MOTOR

(71) Applicant: HL MANDO CORPORATION, Gyeonggi-do (KR)

(72) Inventor: Hyeung Shin, Gyeonggi-do (KR)

(73) Assignee: HL MANDO CORPORATION, Gyeonggi-do (KR)

(*) Notice: Subject to any disclaimer, the term of this patent is extended or adjusted under 35 U.S.C. 154(b) by 147 days.

(21) Appl. No.: 18/388,789

(22) Filed: Nov. 10, 2023

(65) Prior Publication Data
US 2024/0421736 A1 Dec. 19, 2024

(30) Foreign Application Priority Data
Jun. 15, 2023 (KR) .................... 10-2023-0076555

(51) Int. Cl.
*H02P 21/00* (2016.01)
*H02P 21/22* (2016.01)
*H02P 21/24* (2016.01)
*H02P 25/22* (2006.01)

(52) U.S. Cl.
CPC .............. *H02P 21/22* (2016.02); *H02P 21/24* (2016.02); *H02P 25/22* (2013.01); *H02P 2207/05* (2013.01)

(58) Field of Classification Search
CPC .... H02P 21/22; H02P 2207/05; H02P 25/022; H02P 21/30; H02P 27/06; H02P 27/04; H02P 21/24; H02P 21/20
See application file for complete search history.

(56) References Cited

FOREIGN PATENT DOCUMENTS

EP 2704311 A2 * 3/2014 .......... H02P 21/0017

OTHER PUBLICATIONS

Office Action dated May 12, 2025 for Korean Patent Application No. 10-2023-0076555 and its English translation provided by Applicant's foreign counsel.
Hye-Ung Shin et al.: "Inconsistent Inductance Estimation Technique of IPMSM Using the Feedforward of the Current Controller", May 31, 2023, pp. 1-3 (English Abstract).

* cited by examiner

*Primary Examiner* — Karen Masih
(74) *Attorney, Agent, or Firm* — WOMBLE BOND DICKINSON (US) LLP

(57) ABSTRACT

Disclosed are an apparatus and a method for detecting the abnormal inductance of the IPM synchronous motor, in which since it may be confirmed whether a motor parameter used for controlling a current IPM synchronous motor is normal by using anti-windup feedforward, it is possible to set a more accurate motor parameter, so maximum performance of the IPM synchronous motor can be shown and a torque ripple and noise generated by an inaccurate motor parameter can be prevented.

20 Claims, 8 Drawing Sheets

US 12,556,117 B2

APPARATUS AND METHOD FOR DETECTING ABNORMAL INDUCTANCE OF INTERIOR PERMANENT MAGNET SYNCHRONOUS MOTOR

CROSS-REFERENCE TO RELATED APPLICATIONS

This application claims benefit and priority to Korean Patent Application No. 10-2023-0076555, filed on Jun. 15, 2023, with the Korean Intellectual Property Office, the disclosure of which is incorporated herein in its entirety by reference.

TECHNICAL FIELD

The present disclosure relates to an apparatus and a method for detecting abnormal inductance of an interior permanent magnet (IPM) synchronous motor, and more particularly, to an apparatus and a method for controlling an operation of the IPM synchronous motor.

BACKGROUND

Torque control of a motor requires an accurate parameter of the motor. When the parameter is inaccurate, desired performance of the motor cannot be shown. In particular, the parameter of the motor is more important in a weak magnetic flux control section, and when the parameter is inaccurate, there is a problem in that noise is accompanied jointly with a torque ripple.

SUMMARY

The present disclosure has been made in an effort to provide an apparatus and a method for detecting abnormal inductance of an interior permanent magnet (IPM) synchronous motor, which detects the abnormal inductance of the IPM synchronous motor by using anti-windup feedforward.

Other objects of the present disclosure, which are not explicitly described, may be additionally considered within the scope which can be easily deduced from the following detailed description and the effects thereof.

In order to achieve the technical object, an exemplary embodiment of the present disclosure provides an apparatus for detecting abnormal inductance of an interior permanent magnet (IPM) synchronous motor, which includes: an IPM synchronous motor; and a control circuit controlling an operation of the IPM synchronous motor, and detecting an abnormal inductance of the IPM synchronous motor by using an anti-windup feedforward.

Here, the IPM synchronous motor may be a 3-phase IPM synchronous motor.

Here, the control circuit determines whether a control inductance which is a parameter of the IPM synchronous motor used for the torque control of the IPM synchronous motor is equal to an actual inductance of the IPM synchronous motor to detect whether the control inductance is abnormal.

Here, the control circuit may determine whether the control inductance is equal to the actual inductance by using an error value acquired based on an anti-windup q-axis voltage and an anti-windup d-axis voltage.

Here, the control circuit acquires the error value by subtracting the anti-windup d-axis voltage from the anti-windup q-axis voltage, and compares an absolute value of the error value and a predetermined threshold to determine whether the control inductance is equal to the actual inductance.

Here, the control circuit may determine, when the absolute value of the error value is larger than the threshold, that the control inductance is not equal to the actual inductance to detect that the control inductance is abnormal, and determine, when the absolute value of the error value is equal to the threshold or smaller than the threshold, that the control inductance is equal to the actual inductance to detect that the control inductance is normal.

Here, the control circuit may acquire the anti-windup q-axis voltage based on a d-axis voltage and a q-axis feedforward voltage, and acquire the anti-windup d-axis voltage based on a q-axis voltage and a d-axis feedforward voltage.

Here, the control circuit may acquire the q-axis feedforward voltage based on a stator resistance, a q-axis current command, an electric angular velocity, a torque constant, a d-axis actual inductance, and a d-axis current command, and acquire the d-axis feedforward voltage based on the stator resistance, the d-axis current command, the electric angular velocity, a q-axis actual inductance, and the q-axis current command.

Here, the control circuit may acquire the anti-windup q-axis voltage by using [Equation 1], and acquire the anti-windup d-axis voltage by using [Equation 2], and [Equation 1] above may be $V_{q\_Ant}=U_b-V_d^e-V_{q\_FF}$, the $V_{q\_Ant}$ may represent the anti-windup q-axis voltage, the $U_b$ may represent a battery voltage $V_{DC}$, the $V_d^e$ may represent the d-axis voltage, the $V_{q\_FF}$ may represent the q-axis feedforward voltage, and [Equation 2] above may be $V_{d\_Ant}=U_b-V_q^e-V_{d\_FF}$, the $V_{d\_Ant}$ may represent the anti-windup d-axis voltage, the $V_q^e$ may represent the q-axis voltage, and the $V_{d\_FF}$ may represent the d-axis feedforward voltage.

Here, the control circuit may acquire the q-axis feedforward voltage $V_{q\_FF}$ by using [Equation 3], and acquire the d-axis feedforward voltage $V_{d\_FF}$ by using [Equation 4], and [Equation 3] above may be $$V_{q\_FF} = (R_s i^*_{qe}) + (\omega_r(Ke - L_d i^*_{de})),$$

the $R_s$ may represent the stator resistance, the $i^*_{qe}$ may represent the q-axis current command, the $\omega_r$ may represent the electric angular velocity, the Ke may represent the torque constant, the $L_d$ may represent the d-axis actual inductance, and the $i^*_{de}$ may represent the d-axis current command, and [Equation 4] above be $V_{d\_FF}=(R_s i^*_{de})+(\omega_r L_q i^*_{qe})$, and the $L_q$ may represent the q-axis actual inductance.

In order to achieve the technical object, another exemplary embodiment of the present disclosure provides a method for detecting an abnormal inductance of an IPM synchronous motor, which is performed by an apparatus for detecting an abnormal inductance of an IPM synchronous motor including an IPM synchronous motor and a control circuit, which includes: performing torque control of the IPM synchronous motor; and detecting an abnormal inductance of the IPM synchronous motor by using an anti-windup feedforward.

Here, the IPM synchronous motor may be a 3-phase IPM synchronous motor.

Here, in the detecting, it may be determined whether a control inductance which is a parameter of the IPM synchronous motor used for the torque control of the IPM synchronous motor is equal to an actual inductance of the IPM synchronous motor to detect whether the control inductance is abnormal.

Here, in the detecting, it may be determined whether the control inductance is equal to the actual inductance by using an error value acquired based on an anti-windup q-axis voltage and an anti-windup d-axis voltage.

Here, in the detecting, the error value is acquired by subtracting the anti-windup d-axis voltage from the anti-windup q-axis voltage, and an absolute value of the error value and a predetermined threshold are compared to determine whether the control inductance is equal to the actual inductance.

Here, in the detecting, when the absolute value of the error value is larger than the threshold, it is determined that the control inductance is not equal to the actual inductance to detect that the control inductance is abnormal, and when the absolute value of the error value is equal to the threshold or smaller than the threshold, it is determined that the control inductance is equal to the actual inductance to detect that the control inductance is normal.

Here, in the detecting, the anti-windup q-axis voltage may be acquired based on a d-axis voltage and a q-axis feedforward voltage, and the anti-windup d-axis voltage may be acquired based on a q-axis voltage and a d-axis feedforward voltage.

Here, in the detecting, the q-axis feedforward voltage may be acquired based on a stator resistance, a q-axis current command, an electric angular velocity, a torque constant, a d-axis actual inductance, and a d-axis current command, and the d-axis feedforward voltage may be acquired based on the stator resistance, the d-axis current command, the electric angular velocity, a q-axis actual inductance, and the q-axis current command.

Here, in the detecting, the anti-windup q-axis voltage may be acquired by using [Equation 1], and the anti-windup d-axis voltage may be acquired by using [Equation 2], and, and [Equation 1] above may be $V_{q\_Ant}=U_b-V_d^e-V_{q\_FF}$, the $V_{q\_Ant}$ may represent the anti-windup q-axis voltage, the $U_b$ may represent a battery voltage $V_{DC}$, the $V_d^e$ may represent the d-axis voltage, the $V_{q\_FF}$ may represent the q-axis feedforward voltage, and [Equation 2] above be may $V_{d\_Ant}=U_b-V_q^e-V_{d\_FF}$, the $V_{d\_Ant}$ may represent the anti-windup d-axis voltage, the $V_q^e$ may represent the q-axis voltage, and the $V_{d\_FF}$ may represent the d-axis feedforward voltage.

Here, in the detecting, the q-axis feedforward voltage $V_{q\_FF}$ may be acquired by using [Equation 3], and the d-axis feedforward voltage $V_{d\_FF}$ may be acquired by using [Equation 4], and [Equation 3] above may be $$V_{q\_FF} = (R_s i_{qe}^*) + (\omega_r(Ke - L_d i_{de}^*)),$$

the $R_S$ may represent the stator resistance, the $i^*_{qe}$ may represent the q-axis current command, the $\omega_r$ may represent the electric angular velocity, the Ke may represent the torque constant, the $L_d$ may represent the d-axis actual inductance, and the $i^*_{de}$ may represent the d-axis current command, and [Equation 4] above be $V_{d\_FF}=(R_s i^*_{de})+(\omega_r L_q i^*_{qe})$, and the $L_q$ may represent the q-axis actual inductance.

According to the apparatus and the method for detecting the abnormal inductance of the IPM synchronous motor according to exemplary embodiments of the present disclosure, since it may be confirmed whether a motor parameter used for controlling a current IPM synchronous motor is normal by using anti-windup feedforward, it is possible to set a more accurate motor parameter, so maximum performance of the IPM synchronous motor can be shown and a torque ripple and noise generated by an inaccurate motor parameter can be prevented.

The effects of the present disclosure are not limited to the aforementioned effect, and other effects, which are not mentioned above, will be apparent to a person having ordinary skill in the art from the following disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
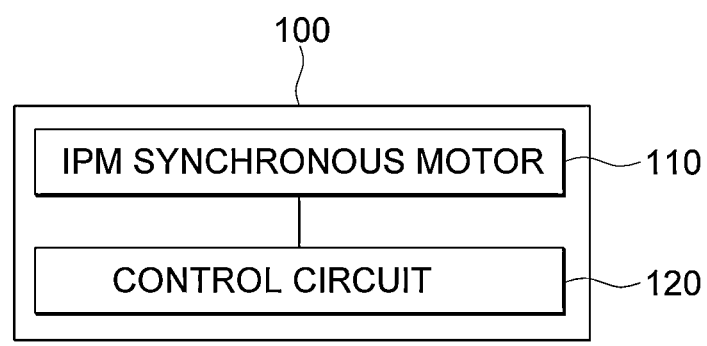
FIG. 1 is a block diagram for describing an apparatus for detecting abnormal inductance of an IPM synchronous motor according to an exemplary embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings. Advantages and features of the present disclosure, and methods for accomplishing the same will be more clearly understood from embodiments described in detail below with reference to the accompanying drawings. However, the present disclosure is not limited to the exemplary embodiments set forth below, and may be embodied in various different forms. The exemplary embodiments are just for rendering the disclosure of the present disclosure complete and are set forth to provide a complete understanding of the scope of the invention to a person with ordinary skill in the technical field to which the present disclosure pertains, and the present disclosure will only be defined by the scope of the claims. Throughout the whole specification, the same reference numerals denote the same elements.

Unless otherwise defined, all terms (including technical and scientific terms) used in the present specification may be used as the meaning which may be commonly understood by the person with ordinary skill in the art, to which the present disclosure pertains. Terms defined in commonly used dictionaries should not be interpreted in an idealized or excessive sense unless expressly and specifically defined.

In this specification, the terms "first," "second,", and the like are used to differentiate a certain component from other components, but the scope should not be construed to be limited by the terms. For example, a first component may be referred to as a second component, and similarly, the second component may be referred to as the first component.

In the present specification, in each step, reference numerals (e.g., a, b, c, etc.) are used for convenience of description, the reference numerals are not used to describe the order of the steps and unless otherwise stated, it may occur differently from the order specified. That is, the respective steps may be performed similarly to the specified order, performed substantially simultaneously, and performed in an opposite order.

In this specification, expressions such as "have", "can have", "include" or "can include", etc. are the presence of the corresponding features (e.g., components such as, numerical value, function, operation, or element), and the presence of an additional feature is not excluded.

The term "unit" disclosed in the specification means software and hardware components such as field programmable gate array (FPGA) or ASIC and the "unit" performs predetermined roles. However, the "unit" is not a meaning limited to software or hardware. The "unit" may be configured to reside on an addressable storage medium and may be configured to play back one or more processors. Accordingly, as one example, the "unit" includes components such as software components, object oriented software components, class components, and task components, processes, functions, attributes, procedures, subroutines, segments of a program code, drivers, firmware, microcodes, circuitry, data structures, and variables. Functions provided in the components and the "units" may be combined into a smaller number of components and "units" or further separated into additional components and "units".

Hereinafter, exemplary embodiments of an apparatus and a method for detecting abnormal inductance of an IPM synchronous motor according to the present disclosure will be described in detail with reference to the accompanying drawings.

First, the apparatus for detecting the abnormal inductance of the IPM synchronous motor according to the exemplary embodiment of the present disclosure will be described with reference to FIGS. 1 to 7.

Figure 2:
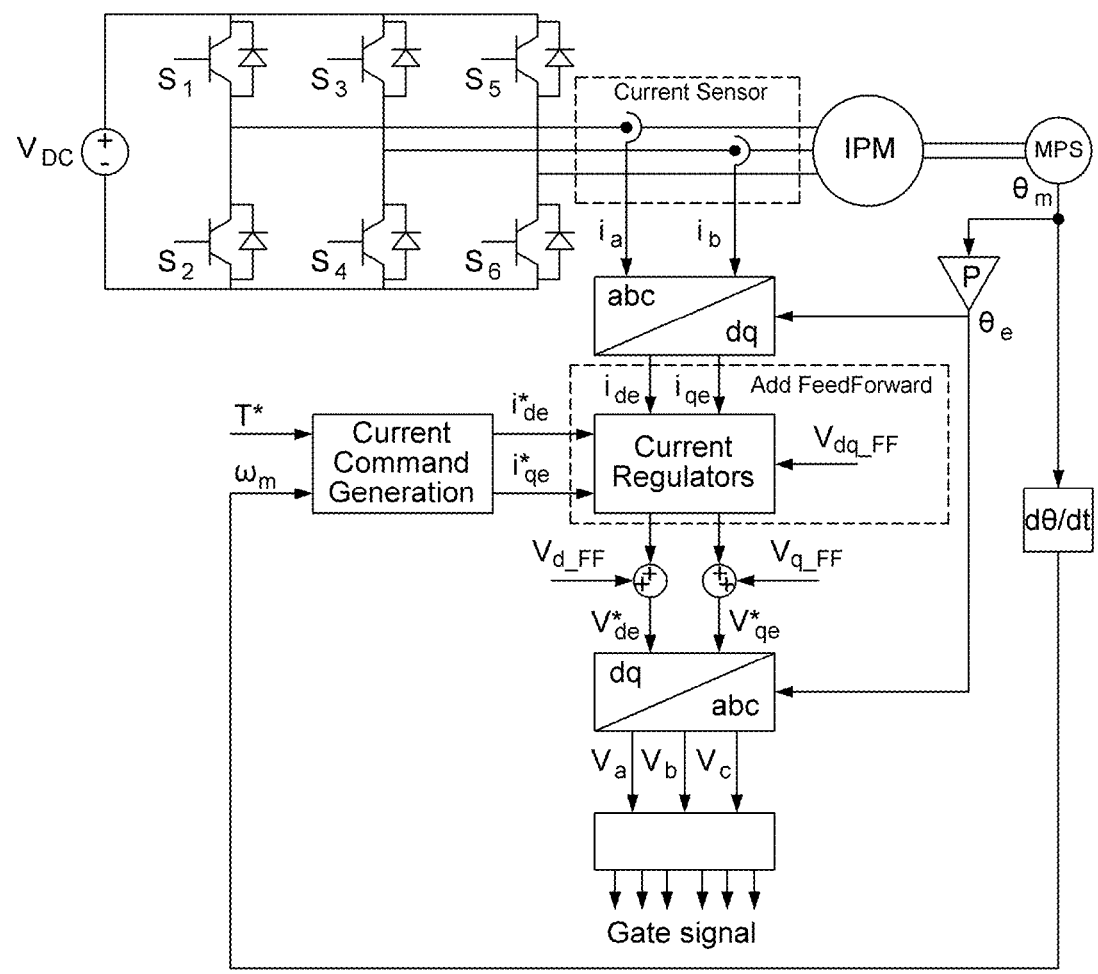
FIG. 2 is a diagram for describing a control circuit including anti-windup feedforward according to an exemplary embodiment of the present disclosure.
Figure 3:
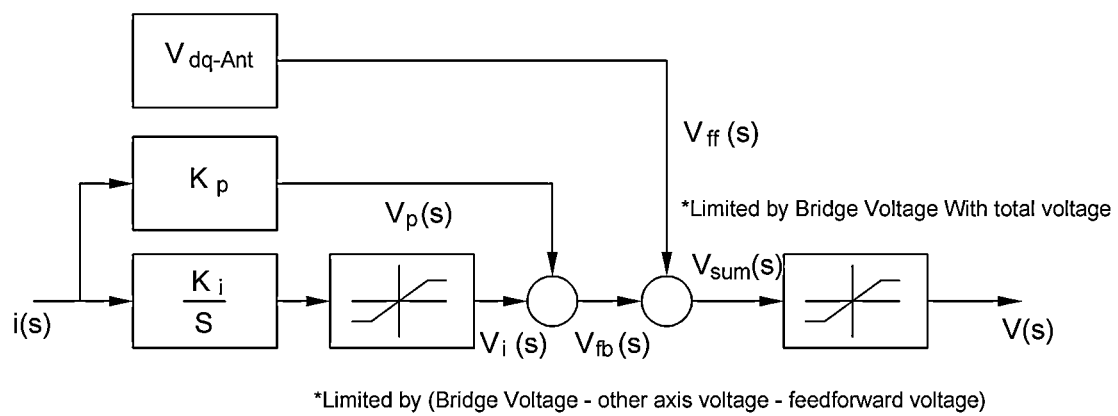
FIG. 3 is a diagram for describing anti-windup including the feedforward illustrated in FIG. 2.
Figure 4:
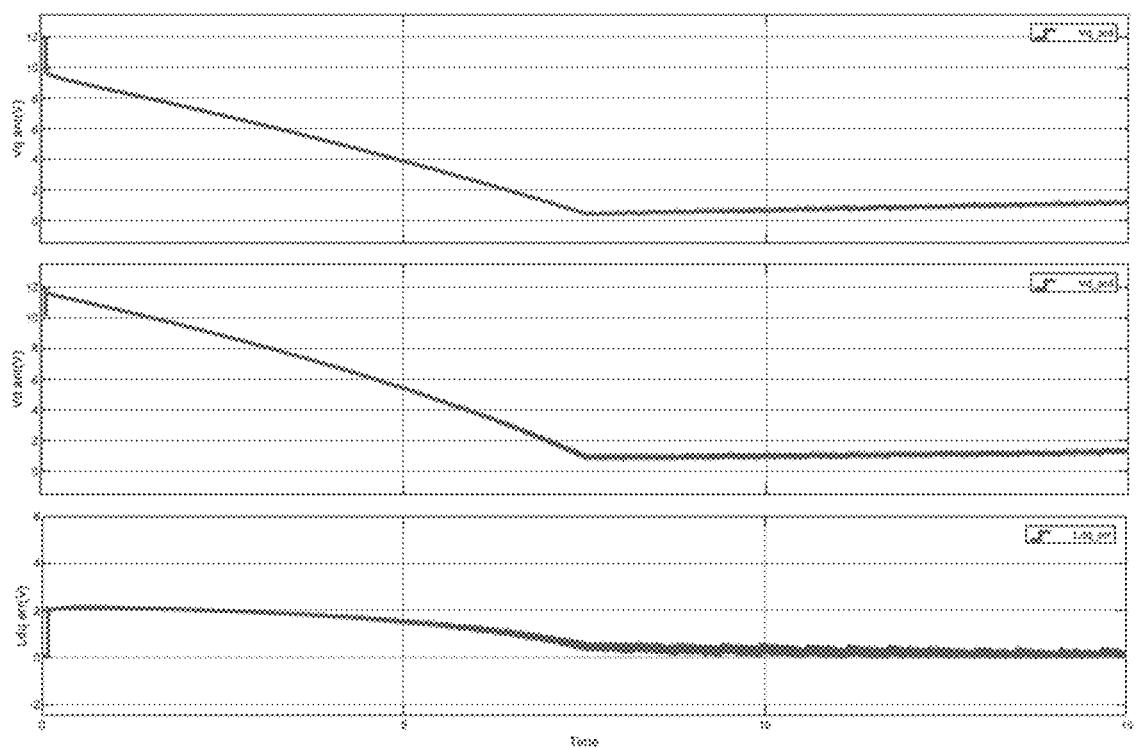
FIG. 4 is a diagram illustrating an anti-windup simulation result when an inductance is normal according to an exemplary embodiment of the present disclosure.
Figure 5:
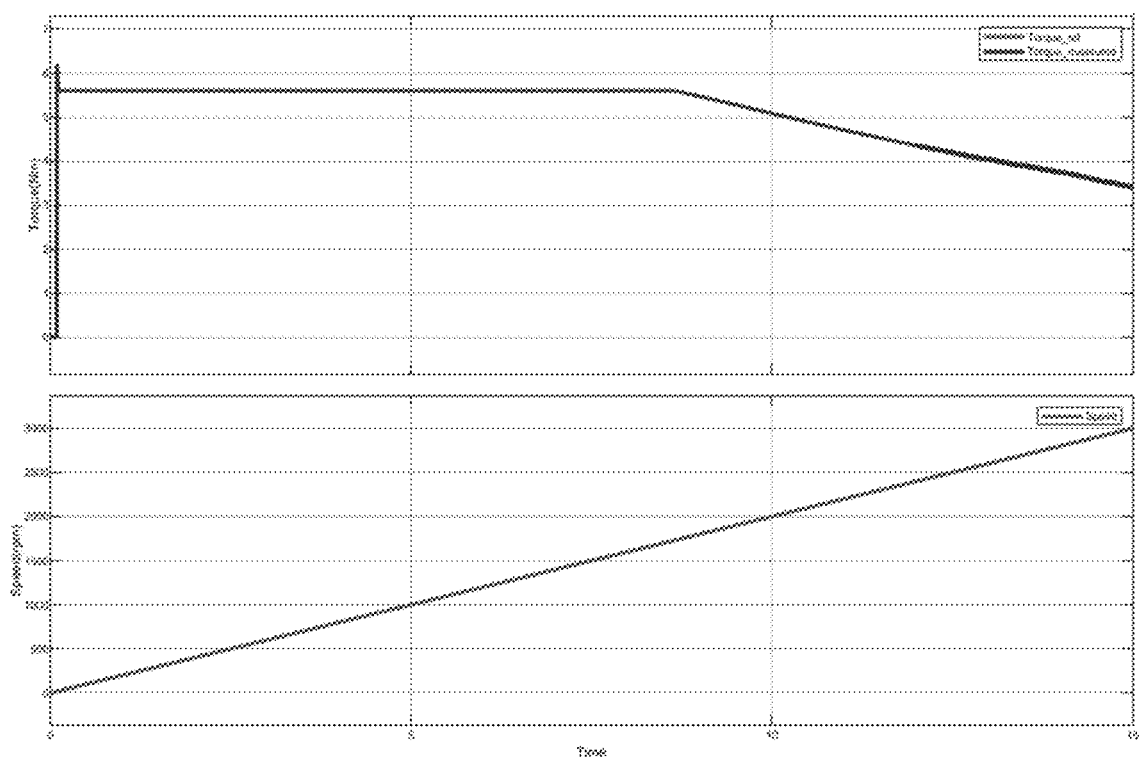
FIG. 5 is a diagram illustrating a TN curve simulation result when the inductance is normal according to an exemplary embodiment of the present disclosure.
Figure 6:
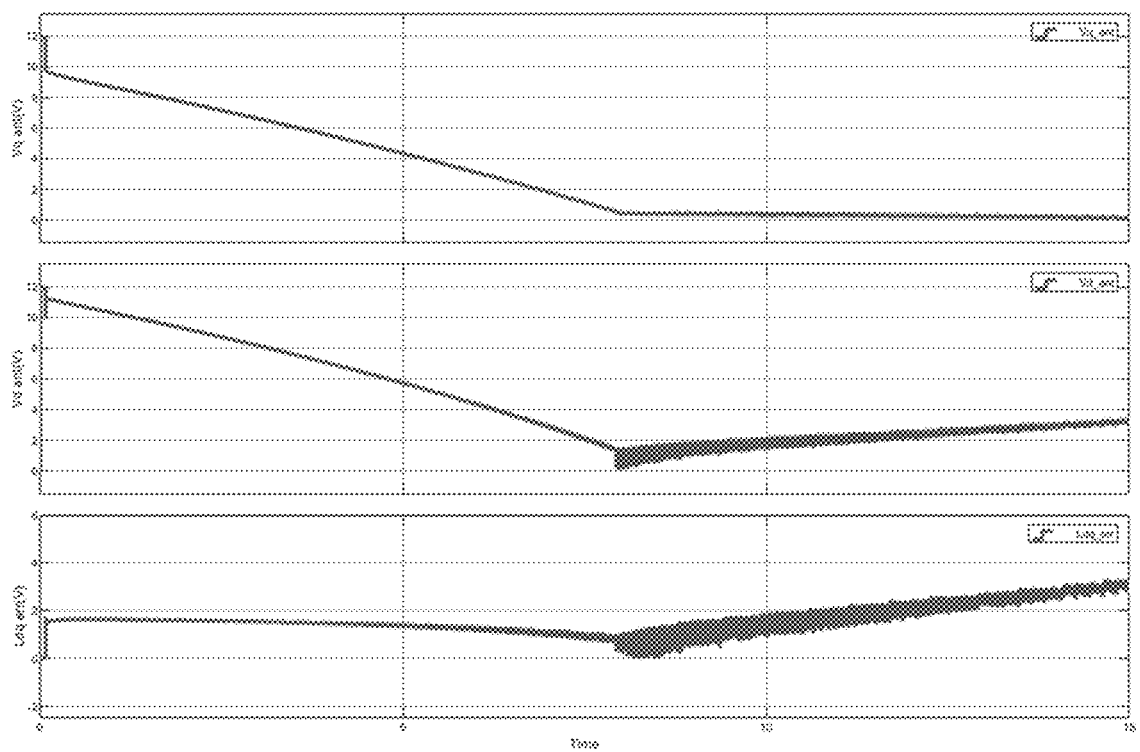
FIG. 6 is a diagram illustrating an anti-windup simulation result when the inductance is abnormal according to an exemplary embodiment of the present disclosure.
Figure 7:
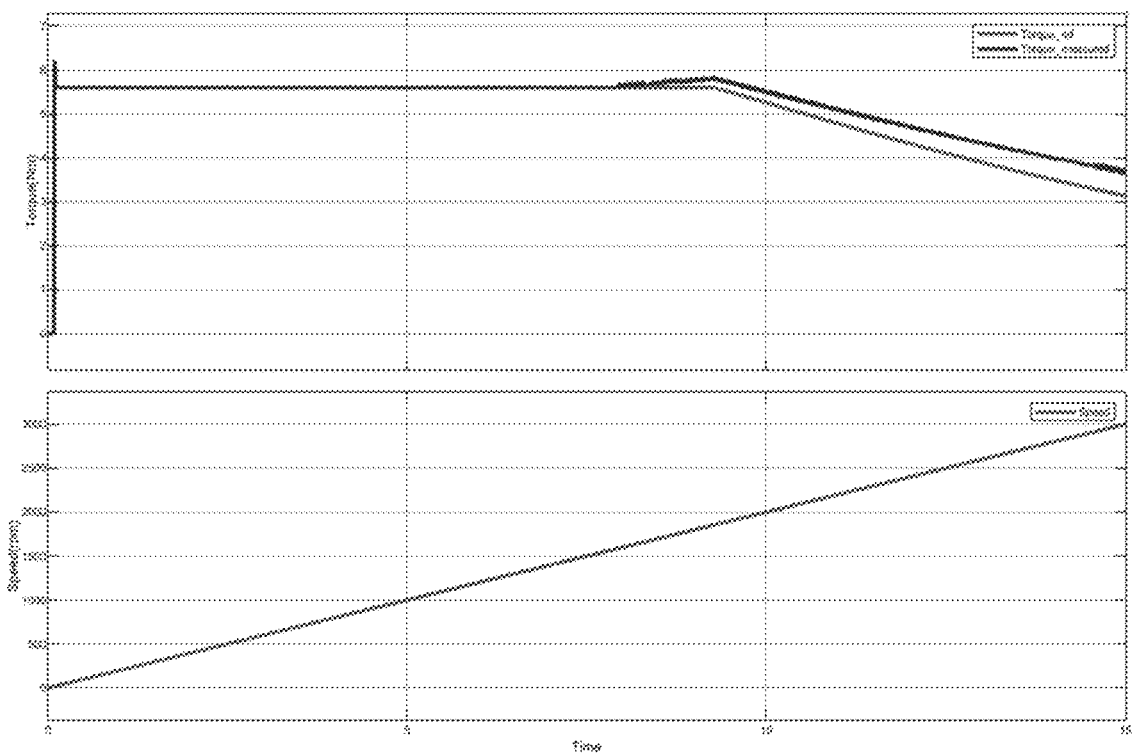
FIG. 7 is a diagram illustrating a TN curve simulation result when the inductance is abnormal according to an exemplary embodiment of the present disclosure.

FIG. 1 is a block diagram for describing an apparatus for detecting abnormal inductance of an IPM synchronous motor according to an exemplary embodiment of the present disclosure, FIG. 2 is a diagram for describing a control circuit including anti-windup feedforward according to an exemplary embodiment of the present disclosure, FIG. 3 is a diagram for describing anti-windup including the feedforward illustrated in FIG. 2, FIG. 4 is a diagram illustrating an anti-windup simulation result when an inductance is normal according to an exemplary embodiment of the present disclosure, FIG. 5 is a diagram illustrating a TN curve simulation result when the inductance is normal according to an exemplary embodiment of the present disclosure, FIG. 6 is a diagram illustrating an anti-windup simulation result when the inductance is abnormal according to an exemplary embodiment of the present disclosure, and FIG. 7 is a diagram illustrating a TN curve simulation result when the inductance is abnormal according to an exemplary embodiment of the present disclosure.

Referring to FIG. 1, the apparatus 100 for detecting abnormal inductance of an interior permanent magnet (IPM) synchronous motor according to an exemplary embodiment of the present disclosure may detect the abnormal inductance of the IPM synchronous motor by using anti-windup feedforward.

That is, the present disclosure proposes a method for determining whether an inductance value which is a motor parameter used for control is equal to an actual inductance of the IPM synchronous motor when driving the IPM synchronous motor by torque control. In other words, the present disclosure proposes a method which adds a voltage feedforward of a current controller in a weak magnetic flux control section to determine whether an inductance of the IPM synchronous motor is normal according to a change of the value. As a result, according to the present disclosure, it may be confirmed whether a motor parameter used for controlling a current IPM synchronous motor is normal.

To this end, the abnormal inductance detecting apparatus 100 may include an IPM synchronous motor 110 and a control circuit 120.

Here, the IPM synchronous motor 110 may be a 3-phase IPM synchronous motor.

In addition, the control circuit 120 may control an operation of the IPM synchronous motor 110, and detect the abnormal inductance of the IPM synchronous motor 110 by using the anti-windup feedforward.

That is, the control circuit 120 determines whether a control inductance which is a parameter of the IPM synchronous motor 110 used for the torque control of the IPM synchronous motor 110 is equal to an actual inductance of the IPM synchronous motor 110 to detect whether the control inductance is abnormal.

To this end, the control circuit 120 may determine whether the control inductance is equal to the actual inductance by using an error value acquired based on an anti-windup q-axis voltage and an anti-windup d-axis voltage.

In this case, the control circuit 120 acquires the error value by subtracting the anti-windup d-axis voltage from the anti-windup q-axis voltage, and compares an absolute value of the error value and a predetermined threshold (0.4, etc.) to determine whether the control inductance is equal to the actual inductance. That is, when the absolute value of the error value is larger than the threshold, the control circuit 120 determines that the control inductance is not equal to the actual inductance to detect that the control inductance is abnormal. On the contrary, when the absolute value of the error value is equal to the threshold or smaller than the threshold, the control circuit 120 determines that the control inductance is equal to the actual inductance to detect that the control inductance is normal.

When described in more detail with reference to FIGS. 2 and 3, a current regulators block of the control circuit 120 may perform current control of current commands $i^*_{de}$ and $i^*_{qe}$ generated according to a torque command T* through a current command generation block.

The control circuit 120 may acquire the error value by using an anti-windup (clamping method) including the feedforward through the current regulators block.

That is, the control circuit 120 may acquire the anti-windup q-axis voltage based on a d-axis voltage and a q-axis feedforward voltage. That is, the control circuit 120 may acquire the anti-windup q-axis voltage by using [Equation 1].

$$V_{q\_Ant} = U_b - V_d^e - V_{q\_FF} \qquad \text{[Equation 1]}$$

Here, $V_{q\_Ant}$ represents the anti-windup q-axis voltage. $U_b$ represents a battery voltage $V_{DC}$. $V_d^e$ represents the d-axis voltage. $V_{q\_FF}$ represents the q-axis feedforward voltage.

The control circuit 120 may acquire the anti-windup d-axis voltage based on a q-axis voltage and a d-axis feedforward voltage. That is, the control circuit 120 may acquire the anti-windup d-axis voltage by using [Equation 2].

$$V_{d\_Ant} = U_b - V_q^e - V_{d\_FF} \qquad \text{[Equation 2]}$$

Here, $V_{d\_Ant}$ represents the anti-windup d-axis voltage. $V_q^e$ represents the q-axis voltage. $V_{d\_FF}$ represents the d-axis feedforward voltage.

Here, the control circuit 120 may acquire the q-axis feedforward voltage based on a stator resistance, a q-axis current command, an electric angular velocity, a torque constant, a d-axis actual inductance, and a d-axis current command. That is, the control circuit 120 may acquire the q-axis feedforward voltage $V_{q\_FF}$ by using [Equation 3].

$$V_{q\_FF} = (R_s i_{qe}^*) + (\omega_r(Ke - L_d i_{de}^*)) \qquad \text{[Equation 3]}$$

Here, $R_s$ represents the stator resistance. $i^*_{qe}$ represents the q-axis current command. $\omega_r$ represents the electric angular velocity. Ke represents the torque constant. $L_d$ represents the d-axis actual inductance. $i^*_{de}$ represents the d-axis current command.

Here, the control circuit 120 may acquire the d-axis feedforward voltage based on the stator resistance, the d-axis current command, the electric angular velocity, the q-axis actual inductance, and the q-axis current command. That is, the control circuit 120 may acquire the d-axis feedforward voltage $V_{d\_FF}$ by using [Equation 4].

$$V_{d\_FF} = (R_s i_{de}^*) + (\omega_r L_q i_{qe}^*) \qquad \text{[Equation 4]}$$

Here, $L_q$ represents the q-axis actual inductance.

The control circuit 120 may acquire the error value $L_{dq\_err}$ by using [Equation 5].

$$L_{dq\_err} = V_{q\_Ant} - V_{d\_Ant} \qquad \text{[Equation 5]}$$

The control circuit 120 compares the error value $L_{dq\_err}$ and a predetermined threshold to confirm whether the control inductance of the IPM synchronous motor 110 is abnormal, that is, the accuracy of the control inductance. For example, when the control inductance used for controlling the IPM synchronous motor 110 is normal, it may be confirmed that the error value. $L_{dq\_err}$ is close to 0 as illustrated in FIG. 4 and it may be confirmed that control is excellently made up to 3000 rpm including weak magnetic flux control as illustrated in FIG. 5. On the contrary, when the control inductance used for controlling the IPM synchronous motor 110 is abnormal (a d-axis control inductance is normal and a q-axis control inductance is abnormal), a value corresponding to approximately 2.5 is output as the error value $L_{dq\_err}$ as illustrated in FIG. 6, so the control inductance used for controlling the IPM synchronous motor 110 should be retuned, and it may be confirmed that a current is not excellently followed from a point where the weak magnetic flux control is started as illustrated in FIG. 7.

Then, the method for detecting the abnormal inductance of the IPM synchronous motor according to the exemplary embodiment of the present disclosure will be described with reference to FIG. 8.

Figure 8:
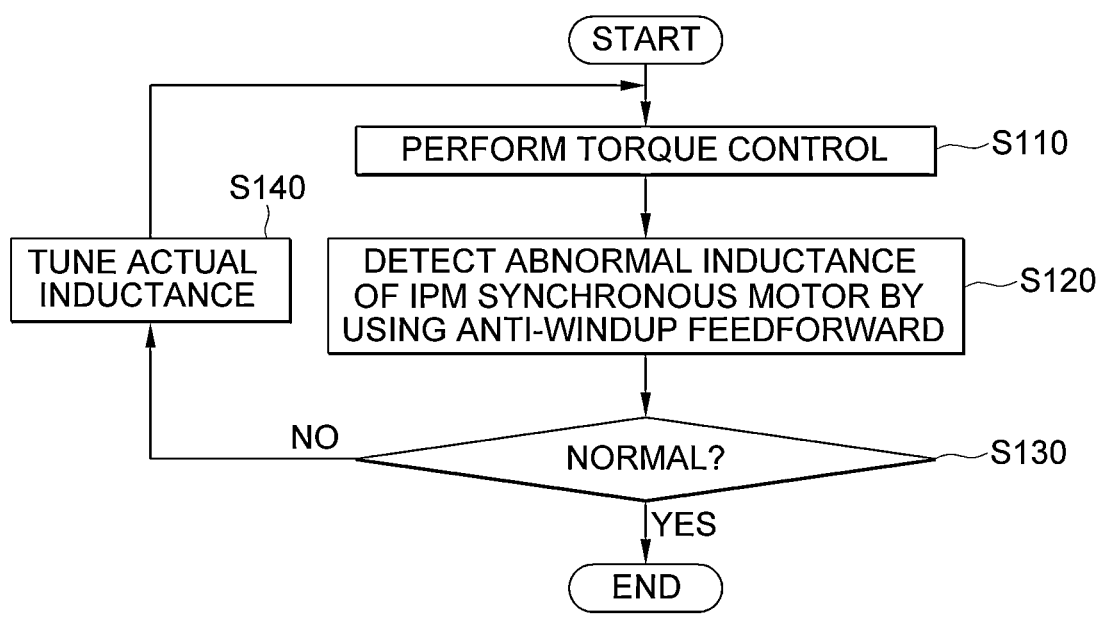
FIG. 8 is a flowchart for describing a method for detecting abnormal inductance of an IPM synchronous motor according to an exemplary embodiment of the present disclosure.

FIG. 8 is a flowchart for describing a method for detecting abnormal inductance of an IPM synchronous motor according to an exemplary embodiment of the present disclosure.

Referring to FIG. 8, the abnormal inductance detecting apparatus 100 may perform torque control (S110).

That is, the abnormal inductance detecting apparatus 100 may perform the torque control of the IPM synchronous motor 110 by using a maximum torque and a maximum velocity of the IPM synchronous motor 110 with respect to a motor side to be controlled. For example, the abnormal inductance detecting apparatus 100 may perform the torque control of the IPM synchronous motor 110 at a load machine side by sweeping from 0 rpm to maximum rpm (including the weak magnetic flux control area) by a ramp by using the maximum velocity of the IPM synchronous motor 110.

Then, the abnormal inductance detecting apparatus 100 may detect an abnormal inductance of the IPM synchronous motor 110 by using an anti-windup feedforward (S120).

That is, the abnormal inductance detecting apparatus 100 determines whether a control inductance which is a parameter of the IPM synchronous motor 110 used for the torque control of the IPM synchronous motor 110 is equal to an actual inductance of the IPM synchronous motor 110 to detect whether the control inductance is abnormal.

To this end, the abnormal inductance detecting apparatus 100 may determine whether the control inductance is equal to the actual inductance by using an error value acquired based on an anti-windup q-axis voltage and an anti-windup d-axis voltage.

In this case, the abnormal inductance detecting apparatus 100 acquires the error value by subtracting the anti-windup d-axis voltage from the anti-windup q-axis voltage, and compares an absolute value of the error value and a predetermined threshold (0.4, etc.) to determine whether the control inductance is equal to the actual inductance. That is, when the absolute value of the error value is larger than the threshold, the abnormal inductance detecting apparatus 100 determines that the control inductance is not equal to the actual inductance to detect that the control inductance is abnormal. On the contrary, when the absolute value of the error value is equal to the threshold or smaller than the threshold, the abnormal inductance detecting apparatus 100 determines that the control inductance is equal to the actual inductance to detect that the control inductance is normal.

More specifically, the abnormal inductance detecting apparatus 100 may acquire the anti-windup q-axis voltage based on a d-axis voltage and a q-axis feedforward voltage. That is, the abnormal inductance detecting apparatus 100 may acquire the anti-windup q-axis voltage by using [Equation 1].

The abnormal inductance detecting apparatus 100 may acquire the anti-windup d-axis voltage based on a q-axis voltage and a d-axis feedforward voltage. That is, the abnormal inductance detecting apparatus 100 may acquire the anti-windup d-axis voltage by using [Equation 2].

Here, the abnormal inductance detecting apparatus 100 may acquire the q-axis feedforward voltage based on a stator resistance, a q-axis current command, an electric angular velocity, a torque constant, a d-axis actual inductance, and a d-axis current command. That is, the abnormal inductance detecting apparatus 100 may acquire the q-axis feedforward voltage by using [Equation 3].

The abnormal inductance detecting apparatus 100 may acquire the d-axis feedforward voltage based on the stator resistance, the d-axis current command, the electric angular velocity, the q-axis actual inductance, and the q-axis current command. That is, the abnormal inductance detecting apparatus 100 may acquire the d-axis feedforward voltage by using [Equation 4].

The abnormal inductance detecting apparatus 100 may acquire the error value by using [Equation 5].

The abnormal inductance detecting apparatus 100 compares the error value and the predetermined threshold (0.4, etc.) to confirm whether the control inductance of the IPM synchronous motor 110 is abnormal, that is, the accuracy of the control inductance.

Thereafter, when the control inductance is normal (S130-Y), the abnormal inductance detecting apparatus 100 may terminate an operation.

That is, when the absolute value of the error value is equal to the threshold or smaller than the threshold, the abnormal inductance detecting apparatus 100 may determine that the control inductance is normal because the control inductance which is the motor parameter used for controlling the IPM synchronous motor 110 coincides with the actual inductance.

On the contrary, when the control inductance is abnormal (S130-N), the abnormal inductance detecting apparatus 100 may tune the actual inductance (S140), and perform steps S110 to S130 again.

That is, when the absolute value of the error value is larger than the threshold, the abnormal inductance detecting apparatus 100 may determine that the control inductance is abnormal because the control inductance which is the motor parameter used for controlling the IPM synchronous motor 110 does not coincide with the actual inductance. In addition, the abnormal inductance detecting apparatus 100 may change the actual inductance, and tune the actual inductance, and perform the detecting operation in steps S110 to S130 again.

Hereinabove, even if it is described that all of constituent elements constituting the exemplary embodiment of the present disclosure are coupled as a single unit or coupled to be operated as a single unit, the present disclosure is not necessarily limited to the exemplary embodiment. That is, among the components, one or more constituent elements may be selectively coupled to be operated within the scope of the object of the present disclosure. Further, each of all components may be implemented as one independent hardware, but some or all of respective components are selectively combined to be implemented as a computer program having a program module performing some or all functions combined one or a plurality of hardware. Further, the computer program is stored in computer readable media including a USB memory, a CD disk, a flash memory, etc., and read and executed by a computer to implement the exemplary embodiments of the present disclosure. Recording media of the computer program may include a magnetic recording medium, an optical recording medium, and the like.

The above description just illustrates the technical spirit of the present disclosure and various changes, modifications, and substitutions can be made by those skilled in the art to which the present disclosure pertains without departing from an essential characteristic of the present disclosure. Therefore, the exemplary embodiments and the accompanying drawings disclosed in the present disclosure are used to not limit but describe the technical spirit of the present disclosure and the scope of the technical spirit of the present disclosure is not limited by the exemplary embodiments and the accompanying drawings. The protection scope of the present disclosure should be construed based on the following appended claims and it should be appreciated that the technical spirit included within the scope equivalent to the claims belongs to the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus for detecting an abnormal inductance of an interior permanent magnet (IPM) synchronous motor, the apparatus comprising:
    an IPM synchronous motor; and
    a control circuit controlling an operation of the IPM synchronous motor, and detecting an abnormal inductance of the IPM synchronous motor by using an anti-windup feedforward.

2. The apparatus of claim 1, wherein the IPM synchronous motor is a 3-phase IPM synchronous motor.

3. The apparatus of claim 2, wherein the control circuit determines whether a control inductance which is a parameter of the IPM synchronous motor used for the torque control of the IPM synchronous motor is equal to an actual inductance of the IPM synchronous motor to detect whether the control inductance is abnormal.

4. The apparatus of claim 3, wherein the control circuit determines whether the control inductance is equal to the actual inductance by using an error value acquired based on an anti-windup q-axis voltage and an anti-windup d-axis voltage.

5. The apparatus of claim 4, wherein the control circuit acquires the error value by subtracting the anti-windup d-axis voltage from the anti-windup q-axis voltage, and compares an absolute value of the error value and a predetermined threshold to determine whether the control inductance is equal to the actual inductance.

6. The apparatus of claim 5, wherein the control circuit determines, when the absolute value of the error value is larger than the threshold, that the control inductance is not equal to the actual inductance to detect that the control inductance is abnormal, and
    determines, when the absolute value of the error value is equal to the threshold or smaller than the threshold, that the control inductance is equal to the actual inductance to detect that the control inductance is normal.

7. The apparatus of claim 4, wherein the control circuit acquires the anti-windup q-axis voltage based on a d-axis voltage and a q-axis feedforward voltage, and acquires the anti-windup d-axis voltage based on a q-axis voltage and a d-axis feedforward voltage.

8. The apparatus of claim 7, wherein the control circuit acquires the q-axis feedforward voltage based on a stator resistance, a q-axis current command, an electric angular velocity, a torque constant, a d-axis actual inductance, and a d-axis current command, and acquires the d-axis feedforward voltage based on the stator resistance, the d-axis current command, the electric angular velocity, a q-axis actual inductance, and the q-axis current command.

9. The apparatus of claim 8, wherein the control circuit acquires the anti-windup q-axis voltage by using [Equation 1], and acquires the anti-windup d-axis voltage by using [Equation 2], and

[Equation 1] above is $V_{q\_Ant}=U_b-V_d^e-V_{q\_FF}$, the $V_{q\_Ant}$ represents the anti-windup q-axis voltage, the $U_b$ represents a battery voltage $V_{DC}$, the $V_d^e$ represents the d-axis voltage, the $V_{q\_FF}$ represents the q-axis feedforward voltage, and

[Equation 2] above is $V_{d\_Ant}=U_b-V_q^e-V_{d\_FF}$, the $V_{d\_Ant}$ represents the anti-windup d-axis voltage, the $V_q^e$ represents the q-axis voltage, and the $V_{d\_FF}$ represents the d-axis feedforward voltage.

10. The apparatus of claim 9, wherein the control circuit acquires the q-axis feedforward voltage $V_{q\_FF}$ by using [Equation 3], and acquires the d-axis feedforward voltage $V_{d\_FF}$ by using [Equation 4], and

[Equation 3] above is $$V_{q\_FF} = (R_s i_{qe}^*) + (\omega_r(Ke - L_d i_{de}^*)),$$

the $R_s$ represents the stator resistance, the $i^*_{qe}$ represents the q-axis current command, the $\omega_r$ represents the electric angular velocity, the Ke represents the torque constant, the $L_d$ represents the d-axis actual inductance, and the $i^*_{de}$ represents the d-axis current command, and

[Equation 4] above is $V_{d\_FF}=(R_s i^*_{de})+(\omega_r L_q i^*_{qe})$, and the $L_q$ represents the q-axis actual inductance.

11. A method for detecting an abnormal inductance, which is performed by an apparatus for detecting an abnormal inductance of an IPM synchronous motor including an IPM synchronous motor and a control circuit, the method comprising:

performing torque control of the IPM synchronous motor; and detecting an abnormal inductance of the IPM synchronous motor by using an anti-windup feedforward.

12. The method of claim 11, wherein the IPM synchronous motor is a 3-phase IPM synchronous motor.

13. The method of claim 12, wherein in the detecting, it is determined whether a control inductance which is a parameter of the IPM synchronous motor used for the torque control of the IPM synchronous motor is equal to an actual inductance of the IPM synchronous motor to detect whether the control inductance is abnormal.

14. The method of claim 13, wherein in the detecting, it is determined whether the control inductance is equal to the actual inductance by using an error value acquired based on an anti-windup q-axis voltage and an anti-windup d-axis voltage.

15. The method of claim 14, wherein in the detecting, the error value is acquired by subtracting the anti-windup d-axis voltage from the anti-windup q-axis voltage, and an absolute value of the error value and a predetermined threshold are compared to determine whether the control inductance is equal to the actual inductance.

16. The method of claim 15, wherein in the detecting, when the absolute value of the error value is larger than the threshold, it is determined that the control inductance is not equal to the actual inductance to detect that the control inductance is abnormal, and when the absolute value of the error value is equal to the threshold or smaller than the threshold, it is determined that the control inductance is equal to the actual inductance to detect that the control inductance is normal.

17. The method of claim 14, wherein in the detecting, the anti-windup q-axis voltage is acquired based on a d-axis voltage and a q-axis feedforward voltage, and the anti-windup d-axis voltage is acquired based on a q-axis voltage and a d-axis feedforward voltage.

18. The method of claim 17, wherein in the detecting, the q-axis feedforward voltage is acquired based on a stator resistance, a q-axis current command, an electric angular velocity, a torque constant, a d-axis actual inductance, and a d-axis current command, and the d-axis feedforward voltage is acquired based on the stator resistance, the d-axis current command, the electric angular velocity, a q-axis actual inductance, and the q-axis current command.

19. The method of claim 18, wherein in the detecting, the anti-windup q-axis voltage is acquired by using [Equation 1], and the anti-windup d-axis voltage is acquired by using [Equation 2], and

[Equation 1] above is $V_{q\_Ant}=U_b-V_d^e-V_{q\_FF}$, the $V_{q\_Ant}$ represents the anti-windup q-axis voltage, the $U_b$ represents a battery voltage $V_{DC}$, the $V_d^e$ represents the d-axis voltage, the $V_{q\_FF}$ represents the q-axis feedforward voltage, and

[Equation 2] above is $V_{d\_Ant}=U_b-V_q^e-V_{d\_FF}$, and the $V_{d\_Ant}$ represents the anti-windup d-axis voltage, the $V_q^e$ represents the q-axis voltage, and $V_{d\_FF}$ represents the d-axis feedforward voltage.

20. The method of claim 19, wherein in the detecting, the q-axis feedforward voltage $V_{q\_FF}$ is acquired by using [Equation 3], and the d-axis feedforward voltage $V_{d\_FF}$ is acquired by using [Equation 4],

[Equation 3] above is $$V_{q\_FF} = (R_s i_{qe}^*) + (\omega_r(Ke - L_d i_{de}^*)),$$

the $R_s$ represents the stator resistance, the $i^*_{qe}$ represents the q-axis current command, the $\omega_r$ represents the electric angular velocity, the Ke represents the torque constant, the $L_d$ represents the d-axis actual inductance, and the $i^*_{de}$ represents the d-axis current command, and

[Equation 4] above is $V_{d\_FF}=(R_s i^*_{de})+(\omega_r L_q i^*_{qe})$, and the $L_q$ represents the q-axis actual inductance.

* * * * *